United States Patent
You et al.

(10) Patent No.: US 12,323,242 B2
(45) Date of Patent: Jun. 3, 2025

(54) METHOD FOR CODING ON TIME SPACE TWO DIMENSIONAL CHANNEL

(71) Applicant: Southeast University, Jiangsu (CN)

(72) Inventors: Xiaohu You, Jiangsu (CN); Yongming Huang, Jiangsu (CN); Bin Sheng, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 17 days.

(21) Appl. No.: 18/044,126

(22) PCT Filed: Jun. 1, 2022

(86) PCT No.: PCT/CN2022/096611
§ 371 (c)(1),
(2) Date: Mar. 6, 2023

(87) PCT Pub. No.: WO2023/000836
PCT Pub. Date: Jan. 26, 2023

(65) Prior Publication Data
US 2023/0318745 A1    Oct. 5, 2023

(30) Foreign Application Priority Data

Jul. 22, 2021   (CN) .......................... 202110827946.5

(51) Int. Cl.
*H04L 1/06* (2006.01)
*H04L 1/00* (2006.01)

(52) U.S. Cl.
CPC .......... *H04L 1/0625* (2013.01); *H04L 1/0013* (2013.01); *H04L 1/0018* (2013.01); *H04L 1/0071* (2013.01); *H04L 1/0631* (2013.01)

(58) Field of Classification Search
CPC ... H04L 1/0003; H04L 1/0013; H04L 1/0018; H04L 1/0064; H04L 1/0067;
(Continued)

(56) References Cited

U.S. PATENT DOCUMENTS 7,012,967 B2 *   3/2006   Hammons, Jr. ......... H04L 1/065
                                              375/267
2004/0218690 A1   11/2004  Jeong et al.
(Continued)

FOREIGN PATENT DOCUMENTS

CN      1599259 A      3/2005
CN      1684390 A     10/2005
(Continued)

OTHER PUBLICATIONS

You. Xiaohu et al. "Information Theory" *Spatiotemporal 2-D channel coding for very low latency reliable MIMO transmission*, Jan. 10, 2022 (Jan. 10, 2022), pp. 1-6.

*Primary Examiner* — Young T. Tse
(74) *Attorney, Agent, or Firm* — MUNCY, GEISSLER, OLDS & LOWE, P.C.

(57) ABSTRACT

In a method for coding on a time-space two-dimensional channels, the system expresses the coding method with code words, merges the code words to form a space-time two-dimensional codebook, stores the codebook at both ends of the sending terminal and the receiving terminal; the sending terminal selects the coding structure according to the code words, and encodes each data stream according to time-domain coding rates, and forms data blocks of an equal length in the time-domain through the rate matching. The system selects different code word serial numbers, rate matching tables and space time slicing modes according to the requirements of different scenarios for transmission rates, latency and code error rate, as well as channel states and size of data blocks; when a Time Space Concatenated Coding Mode is adopted, the sending terminal performs time-domain coding according to the time-domain slicing mode and the time-domain code words.

10 Claims, 4 Drawing Sheets

(58) Field of Classification Search
CPC ... H04L 1/0071; H04L 1/0612; H04L 1/0618; H04L 1/0625; H04L 1/0656; H04L 1/0631
USPC ........ 375/260, 267, 279, 308; 370/203, 204, 370/208, 335, 342, 345
See application file for complete search history.

(56) References Cited

U.S. PATENT DOCUMENTS

| | | | | |
|---|---|---|---|---|
| 2005/0220210 | A1* | 10/2005 | Hammons, Jr. ........ | H04L 1/0618 375/267 |
| 2005/0249306 | A1* | 11/2005 | Chae .................... | H04L 1/0643 375/267 |
| 2008/0273452 | A1* | 11/2008 | Khan ................... | H04B 7/0669 370/310 |
| 2009/0052354 | A1* | 2/2009 | Wu ...................... | H04L 1/0625 370/336 |

FOREIGN PATENT DOCUMENTS

| | | |
|---|---|---|
| CN | 101227249 A | 7/2008 |
| CN | 101834672 A | 9/2010 |
| CN | 103885037 A | 6/2014 |
| CN | 105681787 A | 6/2016 |
| CN | 109005013 A | 12/2018 |
| CN | 110545379 A | 12/2019 |
| CN | 114050891 A | 2/2022 |
| EP | 159_4245 A2 | 11/2005 |

* cited by examiner

METHOD FOR CODING ON TIME SPACE TWO DIMENSIONAL CHANNEL

TECHNICAL FIELD

The present disclosure relates to a method for transmitting a time-space two-dimensional coded block on channels, which can satisfy the requirements for latency, code error rate and transmission rate in different scenarios, and belongs to the field of channel coding in mobile communication systems.

BACKGROUND

As the fifth-generation mobile communication system (5G) enters the commercial stage, the research and development on the sixth-generation mobile communication system (6G) has been put on the agenda, all countries, major technology enterprises as well as research and development institutions are competing for layout. In February 2019, US President Donald Trump announced that the US would launch the 6G program; in September of the same year, the Finnish government planned to provide approximately 250 million euros for 6G research within eight years; in November of the same year, the economic stimulus plan of Abe's government of Japan was launched, in which 220 billion yen was planned to be invested to support the private sector to research and develop 6G technology; earlier that month of the same year, the Ministry of Science and Technology, together with the National Development and Reform Commission and the Ministry of Education and other departments organized a stat-up meeting on 6G technology research and development in Beijing, the establishment of the 6G technology research and development promotion working group and the overall expert group marks the official launch of China's 6G technology research and development work. On Feb. 19 to 26, 2020, at the 34th International Telecommunication Union Radio Communication 5D Working Group (ITU-R WP5D) meeting held in Geneva, Switzerland, ITU officially launched the research work for 2030 and future (6G), and planned to complete the future technology trend report in June 2022, detailing the technical evolution direction of the international mobile communication system (IMT) after 5G.

At present, 5G supports three major application scenarios: enhanced mobile broadband (eMBB), massive machine communication (mMTC), and low latency and high reliability communication (uRLLC). URLLC has huge application potential in vertical industries such as telemedicine, internet of vehicles and smart factories. In the uRLLC scenario, 5G requires a user plane end-to-end latency within 1 ms and a 99.999% reliability for delivering 32-byte packets. Compared with 5G, the requirements for latency and reliability of 6G in China will likely be further increased to 0.1 ms and 99.9999% in the future. In traditional communication systems, reliability is mainly achieved by the technologies such as reducing the coding rate of the channel coding and increasing the coded-block length. However, the low latency requires the block length after the channel coding to be as small as possible. Therefore, low latency and high reliability themselves are contradictory requirements. In order to solve this problem, 5G adopts a plurality of new technologies such as mini-slot in the process of standardization. However, in the face of 5G evolution and higher requirements for 6G in the future, the block length is further shortened, the reliability is further improved, and prior art has satisfied the requirements. In addition, some new applications, such as digital twin and extended reality (XR) technology based on immersive multimedia, require not only an ultra-low latency and an ultra-high reliability, but also a large bandwidth, which completely blurs the boundary between the existing uRLLC and eMBB scenarios. Therefore, the 5G evolution and 6G system in the future need to design the same architecture for eMBB and uRLLC to facilitate the smooth transition between the two scenarios.

The existing 5G systems use the large-scale antennas technology, and a channel is decomposed into a plurality of orthogonal layers in space, which can transmit a plurality of independent data streams at the same time. The sending terminal divides data bits to be transmitted into a plurality of parallel data streams, encodes and interleaves the data streams, and then allocates the data streams to one or more layers for transmission. In the eMBB scenario, due the long coded-block lengths, such a sending mode can satisfy requirements for the transmission. However, in the uRLLC scenario, due to the limitation of latency, the block lengths are short and cannot satisfy the required reliability requirements. In addition, this coding method only in the time-domain is not flexible enough to balance between latency, reliability, and transmission rate. The present disclosure provides a time-space two-dimensional coding method, in which on the basis of the existing time-domain coding, the space-domain coding between different layers is increased, the requirements of different scenarios for latency, code error rate and transmission rate can be satisfied by controlling the encoding mode of space-time two domains, and the smooth transition between eMBB and uRLLC scenarios under the same architecture can be achieved. The method is compatible with the existing wireless communication systems such as 5G and IEEE802.11 series, and can be used directly with minor modifications.

SUMMARY

In view of the problems in the prior art, the present disclosure provides a method for coding on a time-space two-dimensional channel, in which the data to be transmitted are coded from the time-domain and the space-domain, respectively, to form time-space two-dimensional coded blocks, the channel coding in the space-domain and the time-domain can adopt different coding structures, coding rates and modulation modes; subsequently, the system expresses each coding method with code words, merges the code words to form a space-time two-dimensional codebook, stores the codebook at both ends of the sending terminal and the receiving terminal, moreover, designs the uplink and downlink signaling that carries code word serial numbers, rate matching tables, and space time slicing mode for interactive information at both ends of the sending terminal and the receiving terminal; next, the sending terminal selects the coding structure according to the code words of the time-domain, and encodes each data stream according to time-domain coding rates, and eventually forms data blocks of an equal length in the time-domain through the rate matching. Then, the system selects different code word serial numbers, rate matching tables and space time slicing modes according to the requirements of different scenarios for transmission rates, latency and code error rate, as well as channel states and size of data blocks to be transmitted; eventually, when a Time Space Concatenated Coding Mode is adopted, the sending terminal firstly performs time-domain coding according to the time-domain slicing mode and the time-domain code words, and then performs the space-domain coding for the two-dimensional data formed after coding according to the space-domain slicing mode and the space-domain code words. When a Space Time Concatenated Coding Mode is adopted, the sending terminal firstly performs the time-domain coding according to the space-domain slicing mode and the time-domain code words, and then performs the space-domain coding for the two-dimensional data formed after coding according to the time-domain slicing mode and the time-domain code words. The technical solution balances latency, transmission rate and reliability by performing a time-space two-dimensional channel coding on the data for a multi-antenna mobile communication system, provides a flexible and reliable wireless transmission mode for the 5G evolution or the future 6G, and satisfies the application requirements under a plurality of scenarios in mobile communication.

In order to achieve the above objectives, the technical solutions of the present disclosure is as follows: a method for coding on a time-space two dimensional channel comprises following steps.

In Step 1, a pilot signal is sent by a sending terminal, a channel is estimated by a receiving terminal, appropriate code word serial numbers, modulation modes, rate matching tables and space-time slicing modes for a time-domain coding and a space-domain coding are selected according to requirements for a transmission time rate, a latency and a code error rate in different scenarios, and then the sending terminal is fed back together with a rank L of the channel.

In Step 2, when adopting a Time Space Concatenated Coding Mode in the time-space two-dimensional coding, data in the space-domain are sliced by the sending terminal according to a feedback time-domain coding rate, and $M^t$ data streams are formed in parallel, each data stream has $K_i^t$ bits, where $0 \leq i \geq M^t - 1$.

In Step 3, a coding structure is selected by the sending terminal according to a code word of the time-domain, and each data stream is coded according to the time-domain coding rate, and eventually data blocks of an equal length in the time-domain are formed by a rate matching.

In Step 4, data in the time-domain are sliced by the sending terminal according to a feedback space-domain coding rate, and $M^s$ data streams are formed in parallel, each data stream has $K_i^s$ bits, where $0 \leq i \geq M^s - 1$.

In Step 5, the coding structure is selected by the sending terminal according to a code word of the space-domain, and each data stream is coded according to the space-domain coding rate, and eventually data blocks containing L bits in the space-domain is formed by the rate matching.

In Step 6, B bits adjacent to each other in the time-domain are modulated according to a feedback modulation mode to form L symbol streams.

In Step 7, when adopting a Space Time Concatenated Coding Mode in the time-space two-dimensional coding, the data in the time-domain are sliced by the sending terminal according to a feedback space-domain coding rate, and $M^s$ data streams are formed in parallel, each data stream has $K_i^s$ is bits, where $0 \leq i \geq M^s - 1$.

In Step 8, the coding structure is selected by the sending terminal according to the code word of the space-domain, and each data stream is coded according to the space-domain coding rate, and eventually data blocks containing L bits in the space-domain are formed by rate matching.

In Step 9, the data in the space-domain are sliced according to feedback space-domain coding rate, and $M^t$ data streams are formed in parallel, each data stream has $K_i^t$ bits, where $0 \leq i \geq M^t - 1$.

In Step 10, the coding structure is selected by the sending terminal according to the code word of the time-domain, and each data stream is coded according to the time-domain coding rate, and eventually the data blocks of the equal length in the time-domain are formed by the rate matching.

In Step 11, the B bits adjacent to each other in the time-domain are modulated according to feedback modulation mode to form the L symbol streams.

The code word refers to the generation matrix of the channel coding; the coding rate refers to the length of the information bit divided by the coded-block length; and B represents the number of bits contained in the constellation diagram with different modulation modes. In addition, the Time-space Two-dimensional Coding (Time-Space Channel Coding) provided by the present disclosure may also be referred to as a Joint Channel Coding, a Multi-layer Joint Coding, a Layer Coding, or a Two-dimensional Channel Coding (Two Dimensions Channel Coding).

As an improvement of the present disclosure, Step 1 is specifically as follows: the receiving terminal determines to adopt a QPSK modulation according to a certain criterion, a space-domain code word adopts $W_0^s$ at a 1/4 coding rate, and a time-domain code word adopts $W_0^t$, $W_1^t$ and $W_1^t$, at 1/4, 1/3 and 1/2 coding rate, at this time, the receiving terminal needs to feed back the modulation mode QPSK, and serial numbers of $W_0^s$, $W_0^t$, $W_1^t$, and $W_2^t$ to the sending terminal.

As an improvement of the present disclosure, Step 2 is specifically as follows: the sending terminal firstly interleaves the transmission bits in time and space, which is expressed as:

$$x=[x_0, x_1, K, x_{255}] = b \cdot D \quad \text{[Formula 5]},$$

where D is a 256×256 interleaving matrix, when D is a unit array, it indicates that the bits are not interleaved, the interleaved bits are serial-to-parallel converted to form 8 bits streams, respectively containing 40, 40, 40, 32, 32, 24, 24, and 24 bits, which is expressed as:

$$x_0 = [x_0, x_1, K, x_{39}]$$

$$x_1 = [x_{40}, x_{41}, K, x_{79}]$$

$$x_2 = [x_{80}, x_{81}, K, x_{119}]$$

$$x_3 = [x_{120}, x_{121}, K, x_{151}]$$

$$x_4 = [x_{152}, x_{153}, K, x_{183}]$$

$$x_5 = [x_{184}, x_{185}, K, x_{207}]$$

$$x_6 = [x_{208}, x_{209}, K, x_{231}]$$

$$x_7 = [x_{232}, x_{233}, K, x_{255}] \quad \text{[Formula 6]}$$

at this time, $M^t=8$; $K_0^t=40$, $K_1^t=40$, $K_2^t=40$; $K_3^t=32$, $K_4^t=32$; $K_5^t=24$, $K_6^t=24$, $K_7^t=24$.

As an improvement of the present disclosure, Step 3 is specifically as follows: the sending terminal adopts the $W_2^t$ coding for $x_0$, $x_1$ and $x_2$ to generate 96 bits, which is expressed as:

$$y_i = [y_i^0, y_i^1, K, y_i^{95}] = x_i \cdot W_2^t, 0 \leq i \leq 2 \quad \text{[Formula 7]},$$

the sending terminal adopts $W_1^t$ coding for $x_3$ and $x_4$ to generate 96 bits, which is expressed as:

$$y_i=[y_i^0,y_i^1,K,y_i^{95}]=x_i \cdot W_1^t, 3\leq i\leq 4 \quad \text{[Formula 8]},$$

the sending terminal adopts $W_0^t$ coding for $x_5$, $x_6$ and $x_7$ to generate 96 bits, which is expressed as:

$$y_i=[y_i^0,y_i^1,K,y_i^{95}]=x_i \cdot W_0^t, 5\leq i\leq 7 \quad \text{[Formula 9]},$$

when coded bits are greater than or less than 96 bits, the prior art is adopted to puncturing or adding, and then the sending terminal merges $y_i$ into a matrix to obtain:

$$Y = \begin{bmatrix} y_0 \\ y_1 \\ M \\ y_7 \end{bmatrix} = \begin{bmatrix} y_0^0 & y_0^1 & L & y_0^{95} \\ y_1^0 & y_1^1 & L & y_1^{95} \\ M & M & O & M \\ y_7^0 & y_7^1 & K & y_7^{95} \end{bmatrix}. \quad \text{[Formula 10]}$$

As an improvement of the present disclosure, Step 5 is specifically as follows: the sending terminal encodes each column in the space-domain to obtain:

$$s_k = [s_0^k, s_1^k, K, s_{31}^k] \quad \text{[Formula 11]}$$
$$= [y_0^k, y_1^k, K, y_7^k] \cdot W_0^s, 0 \leq k \leq 95.$$

As an improvement of the present disclosure, Step 6 is specifically as follows: the sending terminal merges two adjacent sets of vectors for the QPSK modulation to obtain a k-th symbol transmitted on an i-th spatial channel as:

$$z_i^k=s_i^k+j \cdot s_i^{k+1}, k=0,2,4,K,94 i=0,1,2K,31 \quad \text{[Formula 12]},$$

where j represents an imaginary unit without considering a Gery mapping, after the QPSK modulation, B=2, the time-domain has 48 symbols, which satisfies requirements for the latency, when a higher-order modulation such as 16 QAM is adopted, adjacent sets of vectors need to be merged.

As an improvement of the present disclosure, Step 7 is specifically as follows: the sending terminal firstly interleaves the transmission bits in time and space, which is expressed as:

$$x=b \cdot D \quad \text{[Formula 21]},$$

where D is a 256×256 interleaving matrix, when D is a unit array, it indicates that the bits are not interleaved, the interleaved bits are serial-to-parallel converted to divide into 8 bits streams on overage, each bit stream has 32 bits, which is expressed in a matrix as:

$$X = \begin{bmatrix} x_0^0 & x_0^1 & L & x_0^{31} \\ x_1^0 & x_1^1 & L & x_1^{31} \\ M & M & O & M \\ x_7^0 & x_7^1 & K & x_7^{31} \end{bmatrix}, \quad \text{[Formula 22]}$$

at this time, $M^s=32$, and each $K_i^s$ ($0 \leq i \leq 7$) is equal to 8.

As an improvement of the present disclosure, Step 8 is specifically as follows: the sending terminal encodes each column of X in the space-domain to obtain:

$$y_k = [y_0^k, y_1^k, K, y_{31}^k] \quad \text{[Formula 23]}$$
$$= [x_0^k, x_1^k, K, x_7^k] \cdot W_0^s, 0 \leq k \leq 31,$$

which is expressed as a 32×32 matrix to obtain:

$$Y = \begin{bmatrix} y_0 \\ y_1 \\ M \\ y_{31} \end{bmatrix} = \begin{bmatrix} y_0^0 & y_0^1 & L & y_0^{31} \\ y_1^0 & y_1^1 & L & y_1^{31} \\ M & M & O & M \\ y_{31}^0 & y_{31}^1 & K & y_{31}^{31} \end{bmatrix}. \quad \text{[Formula 24]}$$

As an improvement of the present disclosure, Step 10 is specifically as follows: the sending terminal adopts the $W_2^t$ coding for $y_0, y_1, \ldots, y_7$ to generate 96 bits, which is expressed as:

$$s_i=[s_i^0,s_i^1,K,s_i^{95}]=y_i \cdot W_2^t, 0 \leq i \leq 7 \quad \text{[Formula 25]},$$

the sending terminal adopts the $W_1^t$ coding for $y_8, y_9, \ldots, y_{23}$ to generate 96 bits, which is expressed as:

$$s_i=[s_i^0,s_i^1,K,s_i^{95}]=y_i \cdot W_1^t, 8 \leq i \leq 23 \quad \text{[Formula 26]},$$

the sending terminal adopts $W_0^t$ coding for $y_{24}, y_{25}, \ldots, y_{31}$ to generate 96 bits, which is expressed as:

$$s_i=[s_i^0,s_i^1,K,s_i^{95}]=y_i \cdot W_0^t, 24 \leq i \leq 31 \quad \text{[Formula 27]},$$

it should be noted that when coded bits are greater than or less than 96 bits, the prior art is adopted to puncturing or adding.

As an improvement of the present disclosure, Step 11 is specifically as follows: the sending terminal performs the QPSK modulation on $s_i$ to obtain the k-th symbol transmitted on the i-th space channel as:

$$z_i^k=s_i^k+j \cdot s_i^{k+1}, k=0,2,4,K,94 i=0,1,2K,31 \quad \text{[Formula 28]},$$

after the QPSK modulation (B=2), the time-domain has 48 symbols, which satisfies the requirements for the latency. As an improvement of the present disclosure, the spray gun is engraved with a scale value indicating the insertion depth, which is engraved at the assembly of the spray gun and the pressure ring.

Compared with the prior art, the present disclosure has the following advantages: 1) there is only time-domain channel coding in the existing MIMO communication system of the technical solution, whereas the code error rate can be effectively reduced by adding the space channel coding in the present disclosure; 2) through the space-domain channel coding technology provided by the present disclosure, the spatial channel information can be fully utilized to realize a balance between Diversity and Multiplexing, which is especially suitable for super-large antenna systems in the future; 3) in the method for coding based on the time-space two-dimensional channel provided by the present disclosure, the latency can be reduced, the transmission rate can be improved, or the reliability can be enhanced by flexibly adjusting parameters such as the coding rate in the time-domain and space-domain, so as to satisfy the requirements of different application scenarios for 5G evolution and 6G in the future; 4) through the codebook mode provided by the present disclosure, the communication protocol is simplified and the feedback control signaling is compressed; 5) since the present disclosure relates only to the channel coding portion, it can be directly applied to the existing 5G systems and other multi-antenna wireless communication systems, such as the IEEE802.11 series, without changing the existing communication systems and standards.

DETAILED DESCRIPTION OF THE EMBODIMENTS

In order to deepen the understanding of the present disclosure, this embodiment is described in details below in combination with the accompanying drawings.

Embodiment 1

Figure 1:
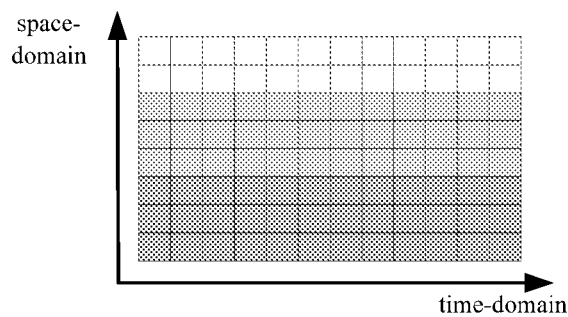
FIG. 1 illustrates a schematic diagram of a time-domain slicing.

With reference to FIG. 1, provided is a method for coding based on a time-space two-dimensional channel, the specific implementations of the present disclosure are described below in combination with the accompanying drawings, so that those skilled in the art can better understand the present disclosure. It should be particularly noted that in the following descriptions that since the contents of the present disclosure may be diluted by the detailed descriptions of some known techniques and functions, these descriptions will be ignored herein.

In consideration of a MIMO system with a total of $N_t$ sending antennas and $N_r$ receiving antennas, as well as S data bits to be send. Firstly, the sending terminal sends a pilot signal, and the receiving terminal performs a channel estimation. Assuming that the channel is a flat fading channel, when the channel is a Frequency Selective Fading channel, an orthogonal frequency division multiplexing (OFDM) technology can be used to convert the channel into the flat fading channel in the frequency domain. Since this portion is consistent with the traditional MIMO and OFDM systems, the existing methods can be used, which will not be repeated herein. The receiving terminal feeds back the statistical channel information, such as the channel correlation matrix, or the instantaneous channel information, such as the channel parameters, to the sending terminal, according to the system setting.

Taking the instantaneous channel feedback as an example, assuming that a matrix H of $N_r \times N_t$ is obtained by the channel estimation, and a singular value decomposition is performed to obtain:

$$H = U\Sigma V^T \quad \text{[Formula 1]},$$

where U is a left singular matrix of $N_r \times N_r$, V is a right singular matrix of $N_t \times N_t$, and $U^T U = I$, $V^T V = I$. $\Sigma$ is a matrix of $N_r \times N_t$, all elements expect those on the main diagonal are 0, and each element on the main diagonal is a singular value. Assuming that the channel has a total of L singular values, and the feedback overhead is not considered. The sending terminal can use the matrix $N_t \times L$ composed of L column vectors on the left side of matrix V as a channel pre-coding array $\tilde{V}$, and the receiving terminal can use the matrix $N_r \times L$ composed of L column vectors on the left side of matrix U as a receiving matrix $\tilde{U}$, namely:

$$\tilde{U}^T H \tilde{V} = \begin{bmatrix} \lambda_0 & \cdots & 0 \\ \vdots & \ddots & \vdots \\ 0 & \cdots & \lambda_{L-1} \end{bmatrix}, \quad \text{[Formula 2]}$$

where $\lambda_i$ represents an i-th singular value of the channel. At this time, MIMO channel is decoupled into L independent spatial channels, an i-th channel is represented by $h_i$ and its parameter is $\lambda_i$. In the present disclosure, the time-domain refers to a set of time samplings on each space channel, and the space domain refers to a set of space channels on each time sampling.

1. Definitions and Principles of Each Term in the Present Disclosure 1.1 Code Word and Coding Rate The code words in the present disclosure refer to generation matrices of the channel coding, and the coding rate refers to the ratio of information bits length to the bits length after coding. Assuming that S information bits are required to be coded, which are represented by the row vector x of 1×S. The coded-block length is n, which are represented by the row vector y of 1×n. The generation matrix is represented by the matrix W of S×n, then the coding process can be expressed as:

$$y = x \cdot W \quad \text{[Formula 3]},$$

at this time, the coding rates are:

$$R = \frac{S}{n}. \quad \text{[Formula 4]}$$

It should be noted that the source signal discussed in Formula 3 is bit, which belongs to GF(2) in Galois Field. The results of the present disclosure are also consistent with the information sources of other Galois Fields. In addition, in Information Theory, the coding rate usually refers to log C/n, where C represents the number of code words that can be formed after S source bits are encoded, and the base number of the logarithmic operator log can be 2 or other numbers. Since there is a definite logarithmic relationship between C and S, the definition of coding rate in Information Theory can also be adopted in the present disclosure.

1.2 Code Book

In the present disclosure, the sending terminal and the receiving terminal keep the same time-domain code book and space-domain code book. Assuming that the size of the time-domain code book is $Q_t$, including $Q_t$ code words, represented by a set of $\{W_0^t, W_1^t, \ldots, W_{Q_t-1}^t\}$; the size of the space-domain code book is $Q_s$, including $Q_s$ code words, represented by a set of $\{W_0^s, W_1^s, \ldots, W_{Q_s-1}^s\}$. $Q_t$ and $Q_s$ can be equal or unequal, and both have a minimum value 1. Channel codes that can be generated by matrix, including low-density parity check code (LDPC), Polar code, Turbo code and BCH and the like, can be adopted in the present disclosure. In addition, due to the simple repetition of the signals, Walsh-Hadamard transformation matrix, discrete Fourier transform (DFT) matrix and the like also belong to a kind of coding in a sense, so they are also included in the scope of the code words of the present disclosure. It should be noted that the code words in the time-domain code book can be different channel codes or different generation matrices of the same channel code, such as BG1 and BG2 of LDPC codes in 5G NR. In addition, each time-domain code word corresponds to a coding rate, the coding rate of each time-domain can be the same or different. Similarly, the code words in the space-domain code book can be different channel codes or different generation matrices of the same channel code. Each space-domain code word corresponds to a coding rate, and the coding rate of each space-domain code word can be the same or different. The time-domain code book can be the same as or different from the space-domain code book, and the range of coding rates of the contained code words is $1 \leq R \leq L$, which is specifically set by the system. The modulation mode is consistent with the traditional system, which can be BPSK, QPSK, 16QAM, and the like.

Through the analysis of L independent channels, according to the size of data blocks, transmission delay and bit error rate requirements required by the system, the receiving terminal selects an appropriate time-domain code word $W_i^t$, space-domain code word $W_k^s$ and signal modulation mode from the time-domain code book and space-domain code book, and feedbacks their serial numbers i and k in the time-domain code book and space-domain code book to the sending terminal.

1.3 Space-Time Slicing Mode

The space-time slicing mode refers to the number of bit lines occupied by the same coding structure, which can be divided into a regular slicing and an irregular slicing. In the regular slicing, the time-domain slicing refers to a number of rows occupied by the coded code word bits in the space-domain, ranging from 1 to L. For example, FIG. 1 illustrates an coded two-dimensional data space, where three code words occupy 3, 3, and 2 lines, respectively, represented by dark gray, light gray, and white in the figure.

Figure 2:
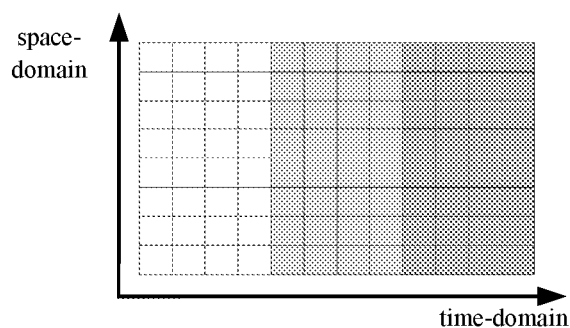
FIG. 2 illustrates a schematic diagram of a space-domain slicing.

In the regular slicing, the space-domain slicing refers to the number of columns occupied by coded code word bits in the time-domain, the minimum is 1 column and the maximum is not more than all columns. For example, FIG. 2 illustrates a coded two-dimensional data space, where three code words occupy 4, 4, and 4 lines respectively, represented by dark gray, light gray, and white in the figure.

Figure 3:
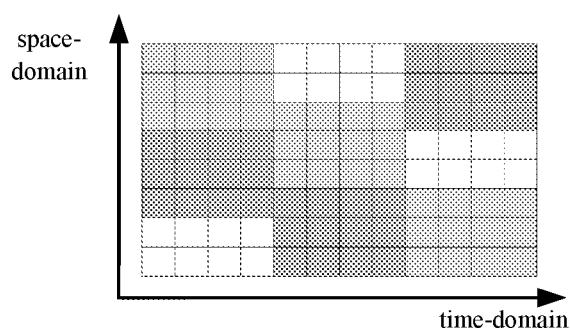
FIG. 3 illustrates a schematic diagram of an irregular slicing.

In the irregular slicing, the code word bits corresponding to the time-domain slicing and the space-domain slicing occupy two-dimensional space in a certain way, as illustrated in FIG. 3. At this time, the three code words are respectively represented by dark gray, light gray and white in the figure. In a specific application, the slicing mode can be defined by the system in advance, and the sending terminal and the receiving terminal can maintain the consistency of decoding through the serial number of the transmission mode.

In addition, when the receiving terminal can feed back all channel information, including singular values, to the sending terminal, the sending terminal can notify the receiving terminal of the serial numbers i and k of the time-domain code words and the space-domain code words, as well as the modulation mode, space-time slicing mode and coding rate matching graph after completing the two-dimensional channel coding through the control channel.

1.4 Application in 5G

Figure 4A:
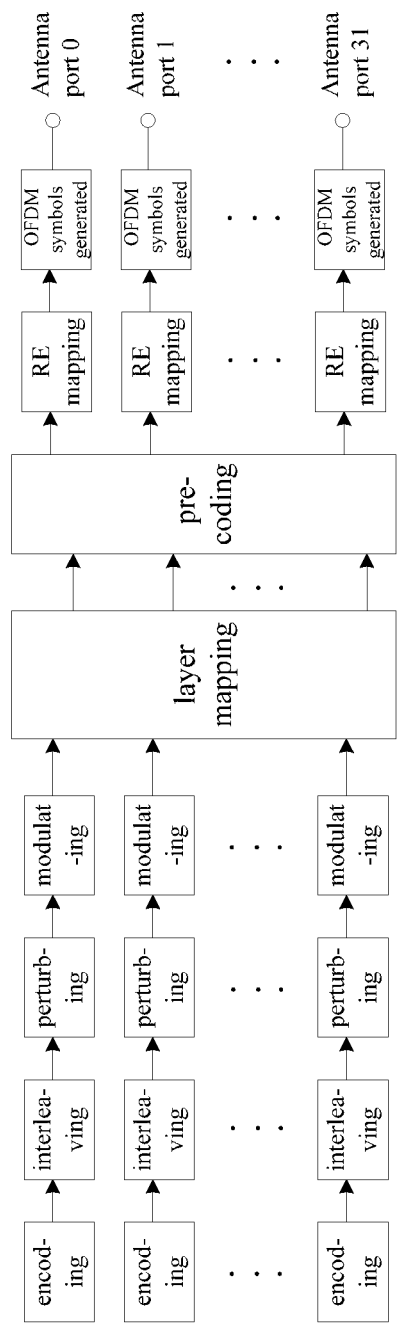
FIG. 4(a) illustrates a schematic diagram of a 5G sending structure.
Figure 4B:
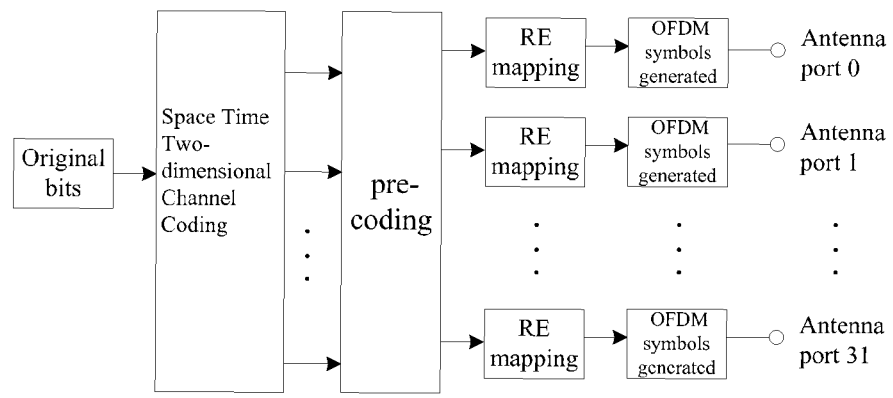
FIG. 4(b) illustrates a schematic diagram of coding based on a time-space two-dimensional channel.

FIG. 1 illustrates a transmission structure of the existing 5G system and applications of time-space two-dimensional channel coding in 5G. FIG. 4(a) illustrates a schematic diagram of a 5G transmission structure and FIG. 4(b) illustrates a schematic diagram of time-space two-dimensional channel coding. In 5G, the transmission blocks (TB) arriving at the upper layer are encoded, interleaved, perturbed and modulated, followed by layer mapping and pre-coding, as illustrated in FIG. 1(a). The number of layers is determined by the rank of the channel and is generally less than or equal to the rank of the channel matrix and the number of physical ports of the antenna. Pre-coding matches the data after layers mapping to the antenna ports, inhibits the interference between data streams during space multiplexing, and reduces the complexity of receiving terminal implementation. In general, the optimal pre-coded matrix is the matrix composed of columns corresponding to the maximum singular values in the right singular matrix V of Formula 1. Since this part can use the existing method, it will not be repeated herein. In 5G system, the sending terminal maps the pre-coded data stream to the two-dimensional physical resources (RE) composed of sub-carriers and time slots at each antenna port, and generates OFDM symbols to send out. FIG. 1(b) illustrates a schematic diagram of coding based on a time-space two-dimensional channel coding proposed by the present disclosure. The space domain herein refers to a set composed of all layers, and the time-domain corresponds to the time occupied by the coding sequence in FIG. 1(a). It should be noted that layer mapping of 5G simply distributes the data after the time-domain coding to different layers for transmission, while the solutions of the present disclosure are to form transmitted data on different layers through the space-domain coding after the time-domain coding.

2. Operation Principles of the Present Disclosure

For example, assuming that the system requires a bit error rate of $10^{-5}$, a normalized delay of 48 symbols (normalized by symbol period), and a data block length of 256 bits that represented by the vector $b=[b_0, b_1, \ldots, b_{255}]$. The size of the time-domain code book and the space-domain code book are both 4, namely, $Q_t=Q_s=4$, and both adopts a generation matrix of LDPC code. The set $\{W_0^t, W_1^t, W_2^t, W_3^t\}$ represents the time-domain code book, the corresponding coding rates are respectively $$\left\{\frac{1}{4}, \frac{1}{3}, \frac{1}{2}, \frac{3}{4}\right\},$$

and the set $\{W_0^s, W_1^s, W_2^s, W_3^s\}$ represents the space-domain code book, the corresponding coding rates are respectively $$\left\{\frac{1}{4}, \frac{1}{3}, \frac{1}{2}, \frac{3}{4}\right\}.$$

Assuming that there are 32 antennas at the receiving terminal and 32 antennas at the sending terminal, through the channel estimation and the singular value decomposition calculation, the receiving terminal obtains that the rank of the channel matrix is 32 and there are 32 non-zero singular values. The present disclosure supports two ways for time-space two-dimensional channel coding, namely, "Time Space Concatenated Coding Mode" of first time and then space and "Space Time Concatenated Coding Mode" of first space and then time, which are described as follows.

2.1 Time Space Concatenated Coding Mode 2.11 Time-Domain Slicing Has 1 Row

Figure 5:
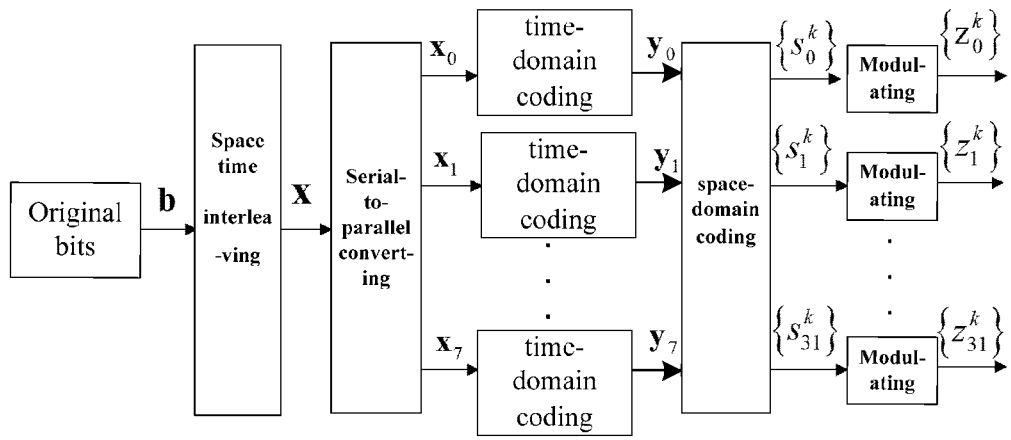
FIG. 5 illustrates a schematic diagram of a Time Space Concatenated Coding Mode.

Firstly, the Time Space Concatenated Coding Mode is discussed. When the regular slicing is adopted, and both time-domain slicing and space-domain slicing occupy only one row. The specific process is as illustrated in FIG. 5.

In Step 1, a pilot signal is sent by a sending terminal, a channel is estimated by a receiving terminal, appropriate code word serial numbers, modulation modes, rate matching tables and space time slicing modes for a time-domain coding and a space-domain coding are selected according to requirements for a transmission time rate, a latency and a code error rate in different scenarios, and then the sending terminal is fed back together with a rank L of the channel.

Figure 6:
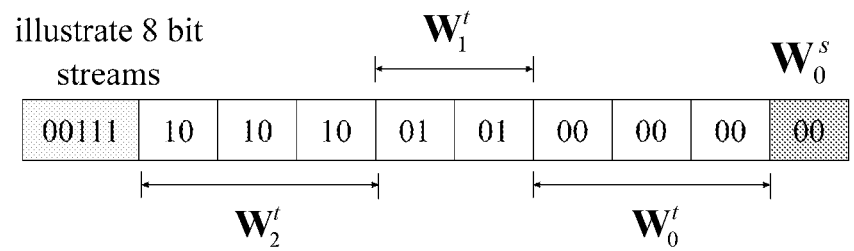
FIG. 6 illustrates a coding rate matching diagram of the Time Space Concatenated Coding Mode.

The receiving terminal determines to adopt a QPSK modulation according to a certain criterion, the space-domain code word adopts $W_0^s$ at a 1/4 coding rate, and the time-domain code word adopts $W_0^t$, $W_1^t$ and $W_2^t$ at 1/4, 1/3 and 1/2 coding rate. At this time, the receiving terminal needs to feedback a QPSK modulation mode and to send the serial number of $W_0^s$, $W_0^t$, $W_1^t$, and $W_2^t$ to the sending terminal. Assuming that a bit map is adopted, the size of the code book is 4 bits, and the rank of the channel is 5 bits, a rate matching diagram is obtained as illustrated in FIG. 6.

FIG. 2 illustrates that there are 8 bit streams, the first three of which are coded by $W_2^t$ at a coding rate of 1/2, the middle two of which are coded by $W_1^t$ at a coding rate of 1/3, and the last three of which are coded by $W_0^t$ at a coding rate of 1/4.

In Step 2, when adopting a Time Space Concatenated Coding Mode in the time-space two-dimensional coding, data in the space-domain are sliced by the sending terminal according to a feedback time-domain coding rate, and $M^t$ data streams are formed in parallel, each data stream has $K_i^t$ bits, where $0 \leq i \geq M^t - 1$.

The sending terminal firstly interleaves the transmission bits in time and space, which is expressed as:

$$x = [x_0, x_1, K, x_{255}] = b \cdot D \quad \text{[Formula 5]},$$

where D is a 256×256 interleaving matrix, when D is a unit array, it indicates that the bits are not interleaved, the interleaved bits are serial-to-parallel converted to form 8 bits streams, respectively containing 40, 40, 40, 32, 32, 24, 24, and 24 bits, which is expressed as:

$$x_0 = [x_0, x_1, K, x_{39}]$$

$$x_1 = [x_{40}, x_{41}, K, x_{79}]$$

$$x_2 = [x_{80}, x_{81}, K, x_{119}]$$

$$x_3 = [x_{120}, x_{121}, K, x_{151}]$$

$$x_4 = [x_{152}, x_{153}, K, x_{183}]$$

$$x_5 = [x_{184}, x_{185}, K, x_{207}]$$

$$x_6 = [x_{208}, x_{209}, K, x_{231}]$$

$$x_7 = [x_{232}, x_{233}, K, x_{255}] \quad \text{[Formula 6]}$$

at this time, $M^t = 8$; $K_0^t = 40$, $K_1^t = 40$, $K_2^t = 40$; $K_3^t = 32$, $K_4^t = 32$; $K_5^t = 24$, $K_6^t = 24$, $K_7^t = 24$.

In Step 3, the sending terminal selects the coding structure according to the code words of the time-domain, and encodes each data stream according to the coding rate of the time-domain, and finally forms data blocks of equal length in the time-domain by rate matching.

The sending terminal adopts $W_2^t$ coding for $x_0$, $x_1$ and $x_2$ to generate 96 bits, which is expressed as:

$$y_i = [y_i^0, y_i^1, K, y_i^{95}] = x_i \cdot W_2^t, 0 \leq i \leq 2 \quad \text{[Formula 7]},$$

the sending terminal adopts $W_1^t$ coding for $x_3$ and $x_4$ to generate 96 bits, which is expressed as:

$$y_i = [y_i^0, y_i^1, K, y_i^{95}] = x_i \cdot W_1^t, 3 \leq i \leq 4 \quad \text{[Formula 8]},$$

the sending terminal adopts $W_0^t$ coding for $x_5$, $x_6$ and $x_7$ to generate 96 bits, which is expressed as:

$$y_i = [y_i^0, y_i^1, K, y_i^{95}] = x_i \cdot W_0^t, 5 \leq i \leq 7 \quad \text{[Formula 9]},$$

it should be noted that when coded bits are greater than or less than 96 bits, the prior art is adopted to puncturing or adding, and then the sending terminal merges $y_i$ into a matrix to obtain:

$$Y = \begin{bmatrix} y_0 \\ y_1 \\ M \\ y_7 \end{bmatrix} = \begin{bmatrix} y_0^0 & y_0^1 & L & y_0^{95} \\ y_1^0 & y_1^1 & L & y_1^{95} \\ M & M & O & M \\ y_7^0 & y_7^1 & K & y_7^{95} \end{bmatrix}. \quad \text{[Formula 10]}$$

In Step 4, data in the time-domain are sliced by the sending terminal according to a feedback space-domain coding rate, and $M^s$ data streams are formed in parallel, each data stream has $K_i^s$ bits, where $0 \leq i \geq M^s - 1$.

Assuming that the sending terminal sets that $M^s = 96$ and all $K_i^s$ ($0 \leq i \leq 95$) is equal to 8 according to the feedback.

In Step 5, the coding structure is selected by the sending terminal according to the code word of the space-domain, and each data stream is coded according to the space-domain coding rate, and eventually data blocks containing L bits in the space-domain is formed by the rate matching.

The sending terminal encodes each column in the space-domain to obtain:

$$s_k = [s_0^k, s_1^k, K, s_{31}^k] = [y_0^k, y_1^k, K, y_7^k] \cdot W_0^s, \quad \text{[Formula 11]}$$

$$0 \leq k \leq 95.$$

In Step 6, B bits adjacent to each other in the time-domain are modulated according to a feedback modulation mode to form L symbol streams.

The sending terminal merges two adjacent sets of vectors for the QPSK modulation to obtain a k-th symbol transmitted on an i-th spatial channel as:

$$z_i^k = s_i^k + j \cdot s_i^{k+1}, k = 0, 2, 4, K, 94 \, i = 0, 1, 2 K, 31 \quad \text{[Formula 12]},$$

where j represents an imaginary unit without considering a Gery mapping, after the QPSK modulation, B=2, the time-domain has 48 symbols, which satisfies requirements for the latency, when a higher-order modulation such as 16QAM is adopted, adjacent sets of vectors need to be merged.

2.1.2 Time-Domain Slicing has a Plurality of Rows

The sending terminal firstly interleaves the transmission bits in time and space, which is expressed as:

$$x = [x_0, x_1, K, x_{255}] = b \cdot D \quad \text{[Formula 13]},$$

where D is a 256×256 interleaving matrix, when D is a unit array, it indicates that the bits are not interleaved. The interleaved bits are serial-to-parallel converted to form three bit streams, which contain 120, 64 and 72 bits, respectively, which is expressed as:

$$x_0 = [x_0, x_1, K, x_{119}]$$

$$x_1 = [x_{120}, x_{121}, K, x_{183}]$$

$$x_2 = [x_{181}, x_{185}, K, x_{255}] \quad \text{[Formula 14]},$$

at this time, $M^s=3$; $K_0{}^t=120$; $K_1{}^t=64$; $K_2{}^t=72$, then the sending terminal adopts $W_2{}^t$ coding for $x_0$ to generate 288 bits, which is expressed as:

$$y_0=[y_0{}^0, y_0{}^1, K, y_0{}^{287}]=x_0 \cdot W_2{}^t \qquad \text{[Formula 15]},$$

the sending terminal adopts $W_1{}^t$ coding for $x_1$ to generate 192 bits, which is expressed as:

$$y_1=[y_1{}^0, y_1{}^1, K, y_1{}^{191}]=x_1 \cdot W_1{}^t \qquad \text{[Formula 16]},$$

the sending terminal adopts $W_0{}^t$ coding for $x_2$ to generate 288 bits, which is expressed as:

$$y_2=[y_2{}^0, y_2{}^1, K, y_2{}^{287}]=x_2 \cdot W_0{}^t \qquad \text{[Formula 17]},$$

similarly, the prior art is adopted to puncturing and adding, then, the sending terminal divides $y_0$ into 3 rows in order, divides $y_1$ into 2 rows in order, and divides $y_2$ into 3 rows in order,
to form the matrix as:

$$Y=[y_0, y_1, K, y_{95}] = \begin{bmatrix} y_0^0 & y_0^1 & L & y_0^{95} \\ y_0^{96} & y_0^{97} & L & y_9^{191} \\ M & M & O & M \\ y_2^{192} & y_2^{193} & K & y_2^{287} \end{bmatrix}, \qquad \text{[Formula 18]}$$

when a space-domain slicing occupies 12 columns, the sending terminal needs to encode each 12 columns of Y matrix by adopting $W_0{}^t$ to generate a total of 8 space-domain code words, which is expressed as:

$$\bar{s}_l=[\bar{s}_0{}^l, \bar{s}_1{}^l, K,$$
$$\bar{s}_{383}{}^l]=[y_{12*l}{}^T, y_{12*l+1}{}^T, K, y_{12*l+11}{}^T] \cdot W_0{}^s, 0 \le l \le 7 \qquad \text{[Formula 19]},$$

at this time, $M^s=8$, and all $K_i{}^s$ ($0 \le i \le 7$) are equal to 12, eventually, $\bar{s}_l$ is divided into 12 columns with 32 elements in each column in order to form:

$$s_k=[s_0{}^k, s_1{}^k, K, s_{31}{}^k], 0 \le k \le 95 \qquad \text{[Formula 20]}.$$

2.2 Space Time Concatenated Coding Mode

In Space Time Concatenated Coding Mode, the receiving terminal determines to adopt a QPSK modulation according to a criterion, the space-domain code word adopts $W_0{}^s$ at a 1/4 coding rate, and the time-domain code word adopts $W_0{}^t$, $W_1{}^t$ and $W_2{}^t$ at 1/4, 1/3 and 1/2 coding rate. At this time, the receiving terminal needs to feedback a QPSK modulation mode and to send the serial number of $W_0{}^s$, $W_0{}^t$, $W_1{}^t$, and $W_2{}^t$ to the sending terminal. Assuming that a bit indication is adopted, the size of the code book is 4 bits, and the rank of the channel is 5 bits, a coding rate matching diagram of Space Time Concatenated Coding Mode is obtained as illustrated in FIG. 7.

Figure 7:
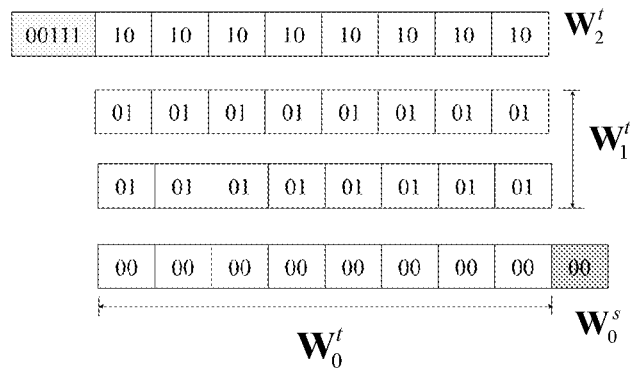
FIG. 7 illustrates a coding rate matching diagram of a Space Time Concatenated Coding Mode.

FIG. 7 illustrates that there are 8 bit streams, and there are 32 bit streams after the space-domain coding, the first eight of which are coded by $W_2{}^t$ at a coding rate of 1/2, the middle sixteen of which are coded by $W_1{}^t$ at a coding rate of 1/3, and the last eight of which are coded by $W_0{}^t$ at a coding rate of 1/4.

In Step 7, when adopting a Space Time Concatenated Coding Mode in the time-space two-dimensional coding, the data in the time-domain are sliced by the sending terminal according to a feedback space-domain coding rate, and $M^s$ data streams are formed in parallel, each data stream has $K_i{}^s$ bits, where $0 \le i \ge M^s-1$.

The sending terminal firstly interleaves the transmission bits in time and space, which is expressed as:

$$x=b \cdot D \qquad \text{[Formula 21]},$$

where D is a 256×256 interleaving matrix, when D is a unit array, it indicates that the bits are not interleaved, the interleaved bits are serial-to-parallel converted to divide into 8 bits streams on overage, each bit stream has 32 bits, which is expressed in a matrix as:

$$X = \begin{bmatrix} x_0^0 & x_0^1 & L & x_0^{31} \\ x_1^0 & x_1^1 & L & x_1^{31} \\ M & M & O & M \\ x_7^0 & x_7^1 & K & x_7^{31} \end{bmatrix}, \qquad \text{[Formula 22]}$$

at this time, $M^s=32$, and each $K_i{}^s$ ($0 \le i \le 7$) is equal to 8.

In Step 8, the coding structure is selected by the sending terminal according to the code words of the space-domain, and each data stream is coded according to the space-domain coding rate, and eventually data blocks containing L bits in the space-domain are formed by rate matching.

The sending terminal encodes each column of X in the space-domain to obtain:

$$y_k = [y_0^k, y_1^k, K, y_{31}^k] = [x_0^k, x_1^k, K, x_7^k] \cdot W_0^s, \qquad \text{[Formula 23]}$$
$$0 \le k \le 31,$$

which is expressed as a 32×32 matrix to obtain:

$$Y = \begin{bmatrix} y_0 \\ y_1 \\ M \\ y_{31} \end{bmatrix} = \begin{bmatrix} y_0^0 & y_0^1 & L & y_0^{31} \\ y_1^0 & y_1^1 & L & y_1^{31} \\ M & M & O & M \\ y_{31}^0 & y_{31}^1 & K & y_{31}^{31} \end{bmatrix}. \qquad \text{[Formula 24]}$$

In Step 9, the data in the space-domain are sliced according to feedback space-domain coding rates, and $M^t$ data streams are formed in parallel, each data stream has $K_i{}^t$ bits, where $0 \le i \ge M^t-1$.

Assuming that the sending terminal sets $M^t=32$ according to the feedback, all $K_i{}^t$ ($0 \le i \le 31$) are equal to 32.

In Step 10, the coding structure is selected by the sending terminal according to the code word of the time-domain, each data stream is coded according to the time-domain a coding rate, and eventually the data blocks of the equal length in the time-domain are formed by the rate matching.

The sending terminal adopts the $W_2{}^t$ coding for $y_0$, $y_1, \ldots, y_7$ to generate 96 bits, which is expressed as:

$$s_i=[s_i{}^0, s_i{}^1, K, s_i{}^{95}]=y_i \cdot W_2{}^t, 0 \le i \le 7 \qquad \text{[Formula 25]},$$

the sending terminal adopts the $W_1{}^t$ coding for $y_8, y_9, \ldots, y_{23}$ to generate 96 bits, which is expressed as:

$$s_i=[s_i{}^0, s_i{}^1, K, s_i{}^{95}]=y_i \cdot W_1{}^t, 8 \le i \le 23 \qquad \text{[Formula 25]},$$

the sending terminal adopts $W_0{}^t$ coding for $y_{24}, y_{25}, \ldots, y_{31}$ to generate 96 bits, which is expressed as:

$$s_i=[s_i{}^0, s_i{}^1, K, s_i{}^{95}]=y_i \cdot W_0{}^t, 24 \le i \le 31 \qquad \text{[Formula 27]},$$

it should be noted that when coded bits are greater than or less than 96 bits, the prior art is adopted puncturing or adding.

In Step 11, the B bits adjacent to each other in the time-domain are modulated according to feedback modulation mode to form the L symbol streams.

Figure 8:
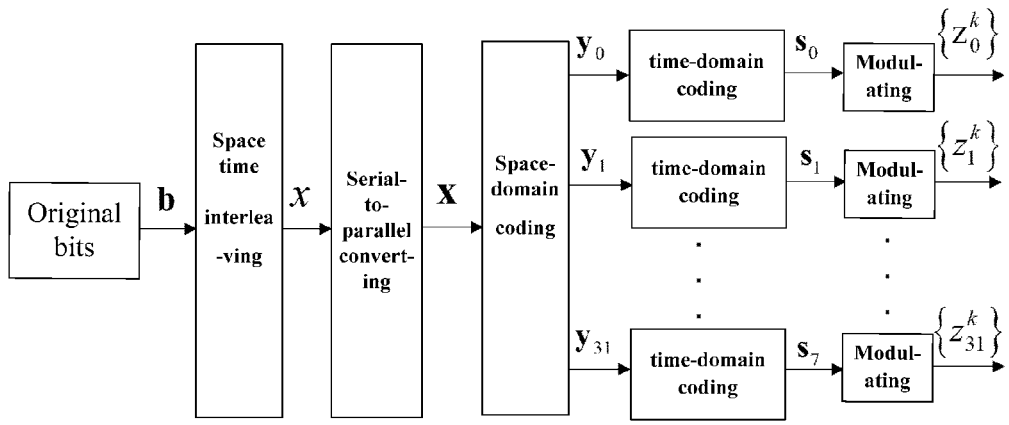
FIG. 8 illustrates a schematic diagram of the Space Time Concatenated Coding Mode.

The sending terminal performs the QPSK modulation on $s_i$ to obtain the k-th symbol transmitted on the i-th space channel as:

$$z_i^k = s_i^k + j \cdot s_i^{k+1},$$

$$k=0,2,4,K,94 \; i=0,1,2K,31 \quad \text{[Formula 28]},$$

after the QPSK modulation (B=2), the time-domain has 48 symbols, which satisfies the requirements for the latency. FIG. 8 illustrates a schematic diagram of the Space Time Concatenated Coding Mode, and the specific process is as illustrated in FIG. 8.

3. Operation Process of the Present Disclosure

According to the above descriptions, a transmission method based on time-space two-dimensional coding can be obtained. The implementation steps are as follows.

In Step 1, a pilot signal is sent by a sending terminal, a channel is estimated by a receiving terminal, appropriate code word serial numbers, modulation modes, rate matching tables and space-time slicing modes for a time-domain coding and a space-domain coding are selected according to requirements for a transmission time rate, a latency and a code error rate in different scenarios, and then the sending terminal is fed back together with a rank L of the channel.

In Step 2, when adopting a Time Space Concatenated Coding Mode in the time-space two-dimensional coding, data in the space-domain are sliced by the sending terminal according to a feedback time-domain coding rate, and $M^t$ data streams are formed in parallel, each data stream has $K_i^t$ bits, where $0 \leq i \geq M^t - 1$.

In Step 3, a coding structure is selected by the sending terminal according to a code word of the time-domain, and each data stream is coded according to the time-domain coding rate, and eventually data blocks of an equal length in the time-domain are formed by a rate matching.

In Step 4, data in the time-domain are sliced by the sending terminal according to a feedback space-domain coding rate, and $M^s$ data streams are formed in parallel, each data stream has $K_i^s$ bits, where $0 \leq i \geq M^s - 1$.

In Step 5, the coding structure is selected by the sending terminal according to a code word of the space-domain, and each data stream is coded according to the space-domain coding rate, and eventually data blocks containing L bits in the space-domain is formed by the rate matching.

In Step 6, B bits adjacent to each other in the time-domain are modulated according to a feedback modulation mode to form L symbol streams.

In Step 7, when adopting a Space Time Concatenated Coding Mode in the time-space two-dimensional coding, the data in the time-domain are sliced by the sending terminal according to a feedback space-domain coding rate, and $M^s$ data streams are formed in parallel, each data stream has $K_i^s$ bits, where $0 \leq i \geq M^s - 1$.

In Step 8, the coding structure is selected by the sending terminal according to the code word of the space-domain, and each data stream is coded according to the space-domain coding rate, and eventually data blocks containing L bits in the space-domain are formed by rate matching.

In Step 9, the data in the space-domain are sliced according to feedback space-domain coding rate, and $M^t$ data streams are formed in parallel, each data stream has $K_i^t$ bits, where $0 \leq i \geq M^t - 1$.

In Step 10, the coding structure is selected by the sending terminal according to the code word of the time-domain, and each data stream is coded according to the time-domain coding rate, and eventually the data blocks of the equal length in the time-domain are formed by the rate matching.

In step 11, the B bits adjacent to each other in the time-domain are modulated according to feedback modulation mode to form the L symbol streams.

The code word refers to the generation matrix of the channel coding; the coding rate refers to the length of the information bit divided by the coded-block length, B represents the number of bits contained in the constellation map with different modulation modes. In addition, the Time-space Two-dimensional Coding (Time-Space Channel Coding) proposed by the present disclosure may also be referred to as a Joint Channel Coding, a Multi-layer Joint Coding, a Layer Coding, or a Two-dimensional Channel Coding (Two Dimensions Channel Coding).

4. Code Error Rate Performance of the Present Disclosure

Figure 9:
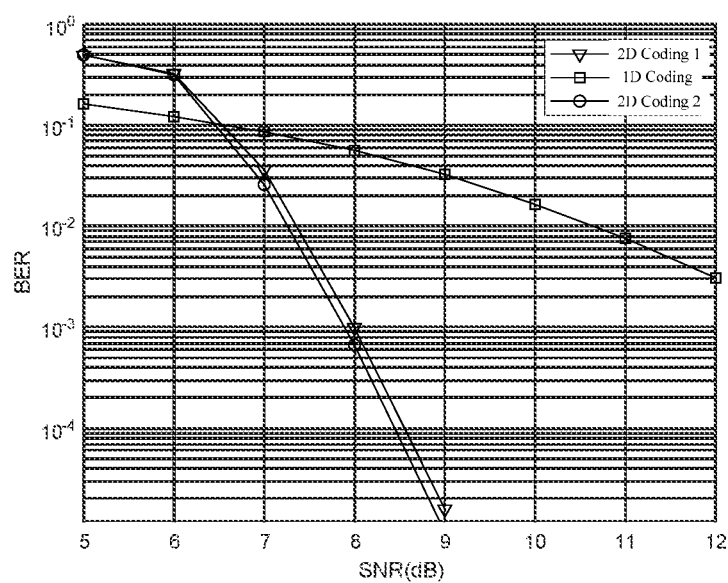
FIG. 9 illustrates a comparison diagram of code error rates.

FIG. 9 illustrates a preliminary comparison of simulation results, that is, a comparison diagram of the code error rate. The 320 information bits are divided into 8 rows and 40 columns. Both the space domain and the time domain are coded by adopting a Polar code at a 1/2 coding rate, and the decoding algorithm adopts a cyclic redundancy check (CRC)-assisted serial cancellation list (CASCL) method with a CRC length of 24 and 16QAM modulation. In order to simplify the calculation, both the space-domain and the time-domain channels are replaced by white Gaussian noise channels. The influence of the space-domain decoding results on the time-domain decoding is equivalent to the noise of the same power. It can be seen from FIG. 9 that the existing system can only encode in the time-domain and cannot establish the connection between space-domains. Therefore, when the code length is relatively short, the bit error rate performance is relatively poor and cannot enter the "waterfall" area, as shown in the curve "one-dimensional coding" in FIG. 9. The Two-Dimensional Channel Coding proposed in the present disclosure is simultaneously coded in both the time-domain and the space-domain, and the relatively greater performance gain is obtained by increasing the channel in the space dimension. The curve "two-dimensional coding 1" in the figure means that every 1 row is taken as a time-domain slicing, and every 13 is taken as a space-domain slicing, while the curve "two-dimensional coding 2" means that every 1 row is taken as a time-domain slicing, and every 29 is taken as a space-domain slicing, and the rest part is not coded. It should be noted that because the coding structure and receiving algorithm are not optimized, the performance of two-dimensional coding is not as good as that of one dimension coding when the signal-to-noise ratio is relatively low.

It should be noted that the above embodiments are not used to limit the protection scope of the present disclosure, and all the equivalent transformations or substitutions made on the basis of the above technical solutions fall within the protection scope of the claims of the present disclosure.

What is claimed is:

1. A method for coding based on a time-space two-dimensional channel, wherein the method comprises steps of:

Step 1: sending, by a sending terminal, a pilot signal, estimating, by a receiving terminal, a channel, and selecting, according to requirements for a transmission time rate, a latency and a code error rate in different scenarios, appropriate code word serial numbers, modulation modes, rate matching tables and space time slicing modes for a time-domain coding and a space-domain coding, and then feeding back to the sending terminal together with a rank L of the channel;

Step 2: slicing, when adopting a Time Space Concatenated Coding Mode in a time-space two-dimensional coding, data in space-domain by the sending terminal according to a feedback time-domain coding rate, and forming $M^t$ data streams in parallel, wherein each of the $M^t$ data streams has $K_i^t$ bits, where $0 \leq i > M^t-1$, $M^t$ is a number of data streams resulted from the sliced data in the space-domain, and $K_i^t$ is a number of bits of each of the $M^t$ data streams;

Step 3: selecting, according to a code word of time-domain, a coding structure by the sending terminal, and coding each of the $M^t$ data streams according to a time-domain coding rate, and eventually forming, by a rate matching, data blocks of an equal length in the time-domain;

Step 4: slicing, according to a feedback space-domain coding rate, data in the time-domain by the sending terminal, and forming $M^s$ data streams in parallel, wherein each of the $M^s$ data streams has $K_i^s$ bits, where $0 \leq i \geq M^s-1$, $M^s$ is a number of data streams resulted from the sliced data in the time-domain, and $K_i^s$ is a number of bits of each of the $M^s$ data streams;

Step 5: selecting, according to a code word of the space-domain, the coding structure by the sending terminal, and coding each of the $M^s$ data streams according to a space-domain coding rate, and eventually forming, by the rate matching, data blocks containing L bits in the space-domain;

Step 6: modulating, according to a feedback modulation mode, B bits adjacent to the space-domain coding rate, the data in the space-domain by the sending terminal and forming the $M^t$ data streams in parallel, wherein each of the $M^t$ data streams has the $K_i^t$ bits, where $0 \leq i \geq M^t-1$, L is a number of layers, and B is a number of bits per symbol;

Step 7: slicing, when adopting a Space Time Concatenated Coding Mode in the time-space two-dimensional coding, the data in the time-domain by the sending terminal according to the feedback space-domain coding rate, and forming the $M^s$ data streams in parallel, wherein each of the $M^s$ data streams has the $K_i^s$ bits, where $0 \leq i \geq M^s-1$;

Step 8: selecting, according to the code word of the space-domain, the coding structure by the sending terminal, coding each of the $M^t$ data streams according to the space-domain coding rate, and eventually forming, by the rate matching, the data blocks containing L bits in the space-domain;

Step 9: slicing, according to the feedback space-domain coding rate, the data in the space-domain by the sending terminal and forming the $M^t$ data streams in parallel, wherein each of the $M^t$ data streams has the $K_i^t$ bits, where $0 \leq i \geq M^t-1$;

Step 10: selecting, according to the code word of the time-domain, the coding structure by the sending terminal, and coding each of the $M^t$ data streams according to the time-domain coding rate, and eventually forming, by the rate matching, the data blocks of the equal length in the time-domain; and Step 11: modulating, according to the feedback modulation mode, the B bits adjacent to each other in the time-domain to form L symbol streams.

2. The method for coding based on the time-space two-dimensional channel according to claim 1, wherein Step 1 comprises steps of:

determining, by the receiving terminal, a quadrature phase shift keying (QPSK) modulation according to a criterion, a space-domain code word that adopts a code word $W_0^s$ at a 1/4 coding rate, and a time-domain code word that adopts respective code words $W_0^t$, $W_1^t$ and $W_2^t$ at 1/4, 1/3 and 1/2 coding rates; and providing the receiving terminal to feed back a QPSK modulation mode, and serial numbers of the code words $W_0^s$, $W_0^t$, $W_1^t$, and $W_2^t$ to the sending terminal.

3. The method for coding based on the time-space two-dimensional channel according to claim 2, wherein Step 2 comprises steps of:

interleaving, by the sending terminal, transmission bits in time and space, which are expressed as:

$$x = [x_0, x_1, K, x_{255}] = b \cdot D \quad \text{[Formula 5]},$$

where $x_0, x_1, K, X_{255}$ are information bits, b is a vector, D is a 256×256 interleaving matrix, when D is a unit array, it indicates that the transmission bits are not interleaved, the interleaved bits are serial-to-parallel converted to form 8 bits streams; and respectively containing 40, 40, 40, 32, 32, 24, 24, and 24 bits, which are expressed as:

$$x_0 = [x_0, x_1, K, x_{39}]$$

$$x_1 = [x_{40}, x_{41}, K, x_{79}]$$

$$x_2 = [x_{80}, x_{81}, K, x_{119}]$$

$$x_3 = [x_{120}, x_{121}, K, x_{151}]$$

$$x_4 = [x_{152}, x_{153}, K, x_{183}]$$

$$x_5 = [x_{184}, x_{185}, K, x_{207}]$$

$$x_6 = [x_{208}, x_{209}, K, x_{231}]$$

$$x_7 = [x_{232}, x_{233}, K, x_{255}] \quad \text{[Formula 6]},$$

wherein $M^t=8$; $K_0^t=40$, $K_1^t=40$, $K_2^t=40$; $K_3^t=32$, $K_4^t=32$; $K_5^t=24$, $K_6^t=24$, $K_7^t=24$.

4. The method for coding based on the time-space two-dimensional channel according to claim 3, wherein Step 3 comprises steps of:

adopting, by the sending terminal, the $W_2^t$ coding for $x_0$, $x_1$ and $x_2$ to generate 96 bits, which are expressed as:

$$y_i = [y_i^0, y_i^1, K, y_i^{95}] = x_i \cdot W_2^t, 0 \leq i \leq 2 \quad \text{[Formula 7]},$$

where $y_i^0, y_i^1, K, y_i^{95}$ are bits coded along an i-th row;

adopting, by the sending terminal, the $W_1^t$ coding for $x_3$ and $x_4$ to generate 96 bits, which are expressed as:

$$y_i = [y_i^0, y_i^1, K, y_i^{95}] = x_i \cdot W_1^t, 3 \leq i \leq 4 \quad \text{[Formula 8]; and}$$

adopting, by the sending terminal, the $W_0^t$ coding for $x_5$, $x_6$ and $x_7$ to generate 96 bits, which are expressed as:

$$y_i = [y_i^0, y_i^1, K, y_i^{95}] = x_i \cdot W_0^t, 5 \leq i \leq 7 \quad \text{[Formula 9]},$$

when coded bits are greater than or less than 96 bits, adopting to puncturing or adding, and then merging, by the sending terminal, $y_i$ into a matrix to obtain:

$$Y = \begin{bmatrix} y_0 \\ y_1 \\ M \\ y_7 \end{bmatrix} = \begin{bmatrix} y_0^0 & y_0^1 & L & y_0^{95} \\ y_1^0 & y_1^1 & L & y_1^{95} \\ M & M & O & M \\ y_7^0 & y_7^1 & K & y_7^{95} \end{bmatrix}.$$ [Formula 10]

5. The method for coding based on the time-space two-dimensional channel according to claim 3, wherein Step 5 comprises a step of:
  encoding, by the sending terminal, each column in the space-domain to obtain:

$$s_k = [s_0^k, s_1^k, K, s_{31}^k] = [y_0^k, y_1^k, K, y_7^k] \cdot W_0^s,$$ [Formula 11]

$$0 \le k \le 95.$$

where $s_0^k$, $s_1^k$, K, $s_{31}^k$ are bits_coded along a k-th column, and k is a column index.

6. The method for coding based on the time-space two-dimensional channel according to claim 5, wherein Step 6 comprises a step of:
  merging, by the sending terminal, two adjacent sets of vectors for the QPSK modulation to obtain a k-th symbol transmitted on an i-th space channel as:

$$z_i^k = s_i^k + j \cdot s_i^{k+1}, k=0,2,4,K,94 \, i=0,1,2K,31$$ [Formula 12], where j represents an imaginary unit without considering a Gery mapping, after the QPSK modulation, B=2, the time-domain has 48 symbols, which satisfy requirements for the latency, when a higher-order modulation of a 16QAM (quadrature amplitude modulation) is adopted, the two adjacent sets of vectors need to be merged.

7. The method for coding based on the time-space two-dimensional channel according to claim 6, wherein Step 7 comprises a step of:
  interleaving, by the sending terminal, the transmission bits in time and space, which are expressed as:

$$x = b \cdot D$$ [Formula 21], wherein b is a vector, D is the 256×256 interleaving matrix, when D is the unit array, it indicates that the transmission bits are not interleaved, the interleaved bits are serial-to-parallel converted to divide into 8 bits streams on average, each bit stream has 32 bits, which are expressed in a matrix as:

$$X = \begin{bmatrix} x_0^0 & x_0^1 & L & x_0^{31} \\ x_1^0 & x_1^1 & L & x_1^{31} \\ M & M & O & M \\ x_7^0 & x_7^1 & K & x_7^{31} \end{bmatrix},$$ [Formula 22]

where $M^s=32$, all $K_i^s$ ($0 \le i \le 7$) are equal to 8, O indicates a first element of the matrix.

8. The method for coding based on the time-space two-dimensional channel according to claim 7, wherein Step 8 comprises a step of:
  encoding, by the sending terminal, each column of the matrix X in the space-domain to obtain:

$$y_k = [y_0^k, y_1^k, K, y_{31}^k] = [x_0^k, x_1^k, K, x_7^k] \cdot W_0^s,$$ [Formula 23]

$$0 \le k \le 31,$$

which is expressed as a 32×32 matrix to obtain:

$$Y = \begin{bmatrix} y_0 \\ y_1 \\ M \\ y_{31} \end{bmatrix} = \begin{bmatrix} y_0^0 & y_0^1 & L & y_0^{31} \\ y_1^0 & y_1^1 & L & y_1^{31} \\ M & M & O & M \\ y_{31}^0 & y_{31}^1 & K & y_{31}^{31} \end{bmatrix}.$$ [Formula 24]

9. The method for coding based on the time-space two-dimensional channel according to claim 8, wherein Step 10 comprises steps of:
  adopting, by the sending terminal, the $W_2^t$ coding for $y_0$, $y_1$, ..., $y_7$ to generate 96 bits, which are expressed as:

$$s_i = [s_i^0, s_i^1, K, s_i^{95}] = y_i \cdot W_2^t, 0 \le i \le 7$$ [Formula 25], where $s_i^0$, $s_i^1$, K, $s_i^{95}$ are bits coded along the i-th row, and i is a row index, adopting, by the sending terminal, the $W_1^t$ coding for $y_8$, $y_9$, ..., $y_{23}$ to generate 96 bits, which are expressed as:

$$s_i = [s_i^0, s_i^1, K, s_i^{95}] = y_i \cdot W_1^t, 8 \le i \le 23$$ [Formula 26]; and adopting, by the sending terminal, $W_0^t$ coding for $y_{24}$, $y_{25}$, ..., $y_{31}$ to generate 96 bits, which are expressed as:

$$s_i = [s_i^0, s_i^1, K, s_i^{95}] = y_i \cdot W_0^t, 24 \le i \le 31$$ [Formula 27], when the coded bits are greater than or less than 96 bits, adopting to puncturing or adding.

10. The method for coding based on the time-space two-dimensional channel according to claim 9, wherein Step 11 comprises a step of:
  performing, by the sending terminal, the QPSK modulation on si to obtain the k-th symbol transmitted on the i-th space channel as:

$$z_i^k = s_i^k + j \cdot s_i^{k+1}, k=0,2,4,K,94 \, i=0,1,2K,31$$ [Formula 28], after the QPSK modulation (B=2), the time-domain has 48 symbols, which satisfy the requirements for the latency.

* * * * *